United States Patent

Shikakura et al.

[11] Patent Number: 5,805,223
[45] Date of Patent: Sep. 8, 1998

[54] IMAGE ENCODING APPARATUS HAVING AN INTRAPICTURE ENCODING MODE AND INTERPICTURE ENCODING MODE

[76] Inventors: Akihiro Shikakura; Masato Kato, both of c/o Canon Kabushiki Kaisha 30-2, 3-chome, Shimomaruko, Ohta-ku, Tokyo, Japan

[21] Appl. No.: 893,001

[22] Filed: Jul. 15, 1997

Related U.S. Application Data

[63] Continuation of Ser. No. 778,540, Jan. 3, 1997, abandoned, which is a continuation of Ser. No. 444,769, May 19, 1995, abandoned.

[30] Foreign Application Priority Data

May 25, 1994 [JP] Japan ................................. 6-110831
Jul. 22, 1994 [JP] Japan ................................. 6-170798

[51] Int. Cl.$^6$ ................................................ H04N 7/18
[52] U.S. Cl. ..................... 348/402; 348/415; 348/411; 348/416; 348/699
[58] Field of Search .................................. 348/402, 405, 348/411, 410, 412, 413, 415, 416, 419, 384, 385, 699, 700, 845, 845.2

[56] References Cited

U.S. PATENT DOCUMENTS

| | | | |
|---|---|---|---|
| 5,164,828 | 11/1992 | Tahara et al. | 348/419 |
| 5,260,783 | 11/1993 | Dixit | 348/409 |
| 5,491,509 | 2/1996 | Jeong et al. | 348/402 |

*Primary Examiner*—Tommy P. Chin
*Assistant Examiner*—Anand S. Rao

[57] ABSTRACT

An image encoding apparatus for encoding input image data using both of an intrapicture encoding mode and a motion compensation interpicture encoding mode has a refresh area setting section for setting a refresh area to allow an intraimage encoding to be forcibly performed in a picture plane so as to overlap between picture planes in a motion compensation range or more, a refresh control section for forcibly setting an encoding mode of the input image data to the intrapicture encoding mode in the refresh area set by the refresh area setting section, and a cancel section for cancelling a refresh when an image portion as a prediction image of an interpicture encoding has been intrapicture encoded even in the refresh area set by the refresh area setting section.

19 Claims, 7 Drawing Sheets

IMAGE ENCODING APPARATUS HAVING AN INTRAPICTURE ENCODING MODE AND INTERPICTURE ENCODING MODE

This application is a continuation of application Ser. No. 08/778,540, filed Jan. 3, 1997, now abandoned, which is a continuation of application Ser. No. 08/444,769 filed May 19, 1995, abandoned.

BACKGROUND OF THE INVENTION

1. Field of the Invention

The invention relates to an image encoding apparatus for encoding image data and, more particularly, to an image encoding apparatus for encoding a series of image data by using both of an intrapicture encoding and an interpicture encoding.

2. Related Background Art

Since image information has an extremely large data amount, various kinds of compression encoding systems have been proposed and examined. As one of them, a method in which an intraframe encoding system and an interframe encoding system are combined is considered as a promising method.

According to the intraframe encoding system, information is compressed by using characteristics of an image such that adjacent pixels in a frame have similar brightness and color. In an actual image, since many portions such as sky, a wall, etc. have similar brightness and color, information can be considerably compressed even in the case of performing intraframe encoding.

Interframe encoding uses a principle such that a motion image is an image in which frames which are neighboring to one another with respect to the time are similar. Only information relating to differences between the frames is encoded and transmitted. Specifically speaking, in an ordinary motion image, picture patterns of adjacent frames are fundamentally the same, although there are slight difference in motion and deformation. By using such information, similarities (motion, color, brightness, etc.) between a frame to be compression encoded and a frame near such a frame (for example, frame just before the frame to be compressed) are calculated. On the basis of the calculation results, a prediction value of the frame to be encoded is calculated based on the near frame. A difference between the frame to be encoded and the prediction value is encoded and transmitted.

For example, in a motion image in which a human object moves to the right among images in which only human objects are displayed, it is sufficient to encode only difference information of the moving human object, so that a high compression ratio can be realized. By adding a motion compensation predicting system to the above system, although movement information of the motion increases, human images before and after the movement almost coincide. Therefore, a difference value of each pixel of the human image is also very small and a higher compression ratio can be accomplished as a whole.

There is also a case where the intraframe encoding and interframe encoding are selected for a block of a part of the frame instead of the whole frame. Namely, there is also a case where a part of the frame is intraframe encoded and the remaining portions of the frame are interframe encoded.

Since the interframe encoding system has a characteristic such that a transmission error is propagated, it is necessary to insert the intraframe encoding system at a proper interval. Such a process is called a refresh.

Since a generation data amount in the intraframe encoding system generally is larger than that in the interframe encoding system, in case of refreshing, if the same quantization steps as the quantization steps in the frame just before the frame to be encoded are used, a data amount suddenly increases and it is difficult to maintain a transmission rate at a predetermined value or less. There is a case where a picture quality remarkably deteriorates due to a frame drop or the like. On the other hand, when the quantization steps are reduced or are made coarse in order to suppress the data generation amount, a deterioration in picture quality due to the reduction becomes conspicuous.

To solve the above problems, there has been proposed a construction such that by setting a refresh area to a part of the whole picture plane and by sequentially moving the refresh area with the elapse of time, a sudden change of an information amount is prevented, a sudden deterioration of the picture quality due to the refresh is reduced, and flickering is eliminated. However, even by such a construction, there is also a case where the refresh area which regularly moved in the picture plane is conspicuous in dependence on an image and such a refresh area becomes a new factor in the picture quality deterioration.

SUMMARY OF THE INVENTION

Under such circumstances, it is an object of the invention to provide an encoding apparatus in an encoding system in which a refresh area is moved with the elapse of time, wherein a deterioration of a picture quality due to refresh is further reduced.

To accomplish the above object, according to a preferred embodiment of the invention, there is provided an image encoding apparatus for encoding input image data by using both of an intrapicture encoding mode and a motion compensation interpicture encoding mode, comprising refresh area setting means for setting a refresh area to allow an intraimage encoding to be forcibly performed in a picture plane so as to overlap between the picture planes in a motion compensation range or more, and refresh control means for forcibly setting an encoding mode of the input image data to the intrapicture encoding mode in the refresh area set by the refresh area setting means, wherein the refresh area that is set by the refresh area setting means is shifted between the picture planes and at least one of a width and a shift amount of the refresh area of each of the picture planes is set so as not to coincide between predetermined picture planes.

According to another preferred embodiment of the invention, there is provided an image encoding apparatus for encoding input image data by using both of an intrapicture encoding mode and a motion compensation interpicture encoding mode, comprising refresh area setting means for setting a refresh area to allow an intraimage encoding to be forcibly performed in a picture plane so as to overlap between the picture planes in a motion compensation range or more, refresh control means for forcibly setting an encoding mode of the input image data to the intrapicture encoding mode in the refresh area set by the refresh area setting means, and cancelling means for cancelling the refresh when an image portion serving as a predictive image of the interpicture encoding has been intrapicture encoded even in the refresh area set by the refresh area setting means.

Other objects, features and advantages of the invention will become apparent from the following detailed description taken in conjunction with the accompanying drawings.

DETAILED DESCRIPTION OF THE PREFERRED EMBODIMENTS

An embodiment according to the invention will now be described hereinbelow with reference to the drawings.

Figure 1:
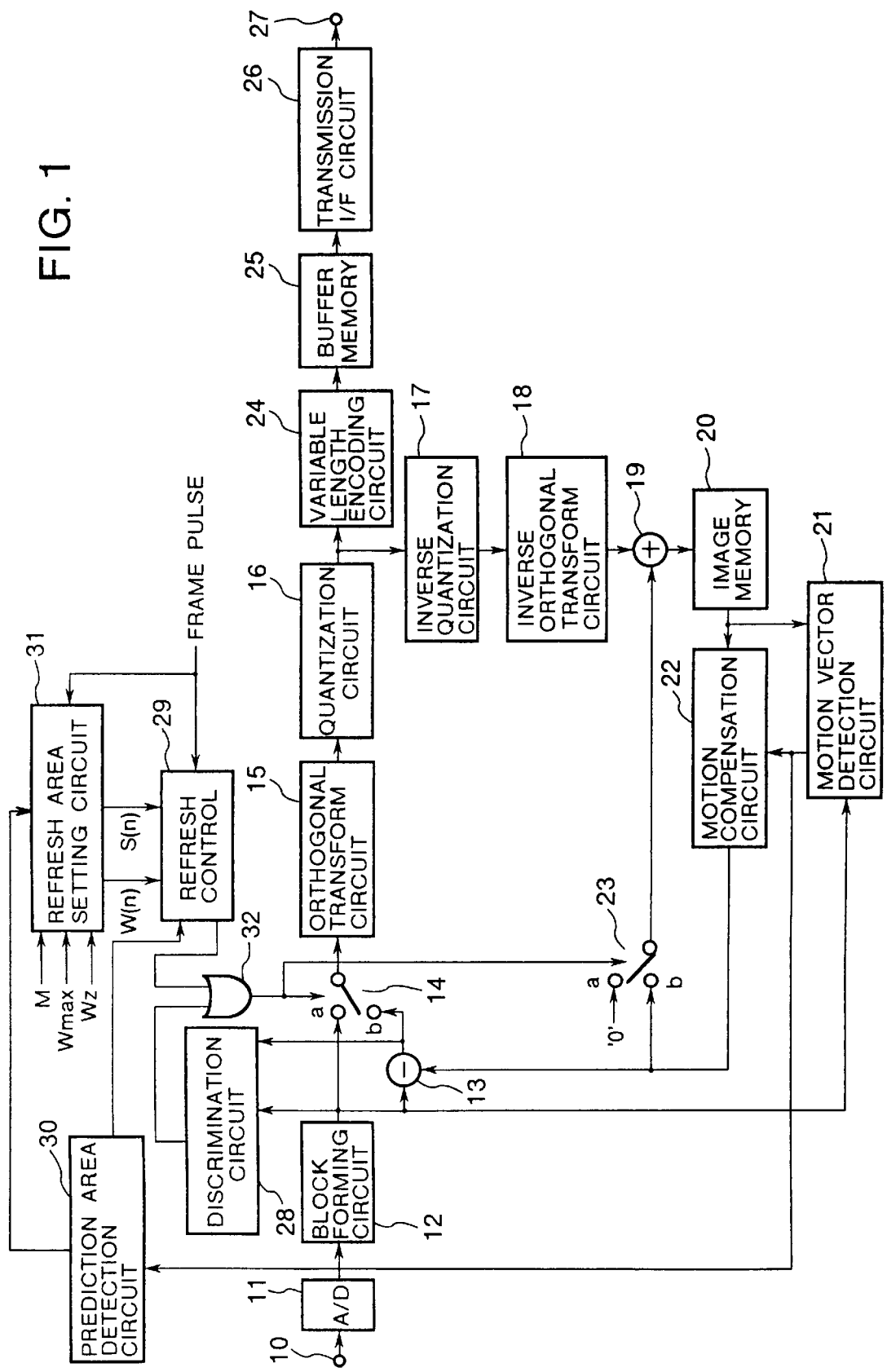
FIG. 1 is a block diagram showing a construction of an image encoding apparatus according to an embodiment of the invention.

FIG. 1 is a block diagram showing a construction of an image encoding apparatus according to the first embodiment of the invention.

In FIG. 1, reference numeral 10 denotes an input terminal to which an analog image signal to be encoded is inputted; 11 an analog/digital (A/D) converting circuit for converting the analog image signal from the input terminal 10 to the digital signal; and 12 a block forming circuit for dividing output image data of the A/D converting circuit 12 to blocks of (a) pixels in the horizontal direction and (b) lines in the vertical direction and for outputting block image data. Values of (a) and (b) are set to 8, respectively, in the embodiment.

Reference numeral 13 denotes a subtracting circuit for subtracting a prediction value that is outputted from a motion compensation circuit 22 from the block image data from the block forming circuit 12; 14 a switch for selecting an output (a contact) of the block forming circuit 12 or an output (b contact) of the subtracting circuit 13; 15 an orthogonal transform circuit for orthogonal transforming (for example, discrete cosine transform) an output of the switch 14 on a block unit basis; and 16 a quantization circuit for quantizing conversion coefficients which are outputted from the orthogonal transform circuit 15.

Reference numeral 17 denotes an inverse quantization circuit for inversely quantizing an output signal of the quantization circuit 16; 18 an inverse orthogonal transform circuit for inverse orthogonal transforming an output signal of the inverse quantization circuit 17; 19 an adding circuit for adding the prediction value (in case of an interframe encoding mode) or "0" (in case of an intraframe encoding mode) to an output signal of the inverse orthogonal transform circuit 18; 20 an image memory for temporarily storing image data decoded by the circuits 17, 18, and 19; 21 a motion vector detection circuit for detecting a motion vector from the image data of the present frame from the block forming circuit 12 and the image data of the preceding frame from the image memory 20; and 22 a motion compensation circuit for motion compensating the image data of the previous frame from the image memory 20 in accordance with the motion vector detected by the motion vector detection circuit 21. An output signal of the motion compensation circuit 22 becomes the prediction value of the interframe encoding and is supplied to the adding circuit 19 through the subtracting circuit 13 and a switch 23.

The switch 23 is switched in an interlocking relation with the switch 14. In case of the intraframe encoding, the switch 23 is connected to the (a) contact and supplies a "0" value to the adding circuit 19. In case of the interframe encoding, the switch 23 is connected to the (b) contact and supplies the output of the motion compensation circuit 22 to the adding circuit 19.

Reference numeral 24 denotes a variable length encoding circuit for variable length encoding the output of the quantization circuit 16; 25 a buffer memory for buffering an output of the variable length encoding circuit 24 in accordance with a transmission rate of a transmission path; 26 a transmission interface (I/F) circuit for converting an output of the buffer memory 25 to a predetermined transmission format; and 27 an output terminal for outputting an output of the transmission I/F circuit 26 to the transmission path.

Reference numeral 28 denotes a discrimination circuit for comparing the output of the block forming circuit 12 and the output of the subtracting circuit 13, thereby discriminating which one of the interframe encoding and the intraframe encoding has a higher (better) encoding efficiency; 29 a refresh control circuit for outputting a refresh control signal indicative of a refresh area of a shift amount of a set value S(n) and a width of a set value W(n) in accordance with a frame pulse; and 30 a prediction area detection circuit for detecting an area to cancel the refresh from a detection output of the motion vector detection circuit 21 and for outputting a refresh cancel signal to the refresh control circuit 29. The detailed operation of the prediction area detection circuit 30 will be described hereinlater.

Reference numeral 31 denotes a refresh area setting circuit for supplying the set values W(n) and S(n) to the refresh control circuit 29 synchronously with a frame pulse. A whole picture plane width Wz, a motion compensation range M, and a maximum refresh area width Wmax are predetermined in accordance with a capacity or the like of the buffer memory 25 and are set in the refresh area setting circuit 31. The refresh cancel signal which is outputted from the prediction area detection circuit 30 is also inputted to the refresh area setting circuit 31.

Both of an output of the discrimination circuit 28 and an output of the refresh control circuit 29 are supplied to an OR circuit 32. An output of the OR circuit 32 controls the switching operations of the switches 14 and 23. The refresh control circuit 29 supplies a "L (low level)" signal to the OR circuit 32 at a timing independent of the refresh. In the frame that is not concerned with the refresh, therefore, the switching operations of the switches 14 and 23 are mainly controlled by the output of the discrimination circuit 28. Each of the switches 14 and 23 is connected to the (a) contact when the output of the OR circuit 32 is at "H(high level)" and is connected to the (b) contact when the output of the OR circuit 32 is at "L" (low level).

A fundamental flow of the processes of the image signal will be first described with reference to FIG. 1.

The A/D converting circuit 11 converts the analog image signal which is inputted from the input terminal 10 to a digital image signal. The block forming circuit 12 divides the output signal of an A/D converting circuit 11 to blocks of (a) (in the embodiment, a=8) pixels in the horizontal direction and (b) (in the embodiment, b=8) lines in the vertical direction. The block image data from the block dividing circuit 12 is supplied to the (a) contact of the switch 14, subtracting circuit 13, motion vector detection circuit 21, and discrimination circuit 28.

The subtracting circuit 13 subtracts the prediction value (output of the motion compensation circuit 22) from the block image data which is outputted from the block forming circuit 12 and supplies prediction error data to the (b) contact of the switch 14.

The discrimination circuit 28 compares the block image data which is outputted from the block forming circuit 12 and the prediction error data which is outputted from the subtracting circuit 13, thereby discriminating which one of the intraframe encoding and the interframe encoding has a higher encoding efficiency. When the intraframe encoding is selected, the discrimination circuit 28 supplies a switch control signal of "H (high level)" to the OR circuit 32. When the interframe encoding is selected, the discrimination circuit 28 supplies a switch control signal of "L (low level)" to the OR circuit 32. When the refresh is not executed, since the output of the refresh control circuit 29 is at "L", the switching operations of the switches 14 and 23 are controlled by the output of the discrimination circuit 28.

The switch 14 is connected to the (a) or (b) contact on the block unit basis in accordance with the output of the OR circuit 32. When the switch 14 is connected to the (a) contact, the switch 23 is also connected to the (a) contact. When the switch 14 is connected to the (b) contact, the switch 23 is also connected to the (b) contact. When each of the switches 14 and 23 is connected to the (a) contact, the intraframe encoding is executed and when it is connected to the (b) contact, the interframe encoding is executed.

The orthogonal transform circuit 15 orthogonal transforms (for example, discrete cosine transform) the image data (original image data or prediction error data) selected by the switch 14 for every block. The quantization circuit 16 quantizes the transformed coefficient data in accordance with quantization step characteristics in consideration of human visual sense characteristics.

The inverse quantization circuit 17 inversely quantizes an output of the quantization circuit 16. The inverse orthogonal transform circuit 18 inverse orthogonal transforms an output of the inverse quantization circuit 17.

As described before, the switch 23 is connected to the (a) contact in the block of the intraframe encoding and is connected to the (b) contact in the block of the interframe encoding.

Thus, the adding circuit 19 generates an output of the inverse orthogonal transform circuit 18 as it is in the block of the intraframe encoding. In the block of the interframe encoding, the adding circuit 19 adds the prediction value to the output of the inverse orthogonal transform circuit 18 and outputs the resultant signal.

The image memory 20 delays the image data which is outputted from the adding circuit 19 by a time of one frame period of time and supplies the delayed image data to the motion vector detection circuit 21 and motion compensation circuit 22. The image data which is outputted from the block forming circuit 12 is also supplied to the motion vector detection circuit 21. The motion vector detection circuit 21 detects a motion vector on an encoding block unit basis from both of the image data and outputs the detection result to the motion compensation circuit 22.

In accordance with the motion vector from the motion vector detection circuit 21, the motion compensation circuit 22 moves, namely, motion compensates the image data of the preceding frame from the image memory 20 so as to set off the motion of the image and supplies the motion compensated image data to the subtracting circuit 13 and the (b) contact of the switch 23 as a prediction value of the present frame.

The variable length encoding circuit 24 variable length encodes the output of the quantization circuit 16 in consideration of the encoding efficiency. An output of the variable length encoding circuit 24 is temporarily stored in the buffer memory 25. The buffer memory 25 adjusts a data rate so that a data generation amount and a transmission data amount of the variable length encoding circuit 24 are equalized on a predetermined time unit basis. The transmission interface circuit 26 reads out the data from the buffer memory 25 synchronously with a transmission clock and outputs to the output terminal 27 by a predetermined transmission format. Although not shown, the motion vector information detected by the motion vector detection circuit 21, a transmission sync signal, an error correction code, and the like are included in the transmission format.

The operation upon refreshing, particularly, the operation of the refresh control circuit 29 by the refresh area setting circuit 31 will now be described in detail.

Figure 2:
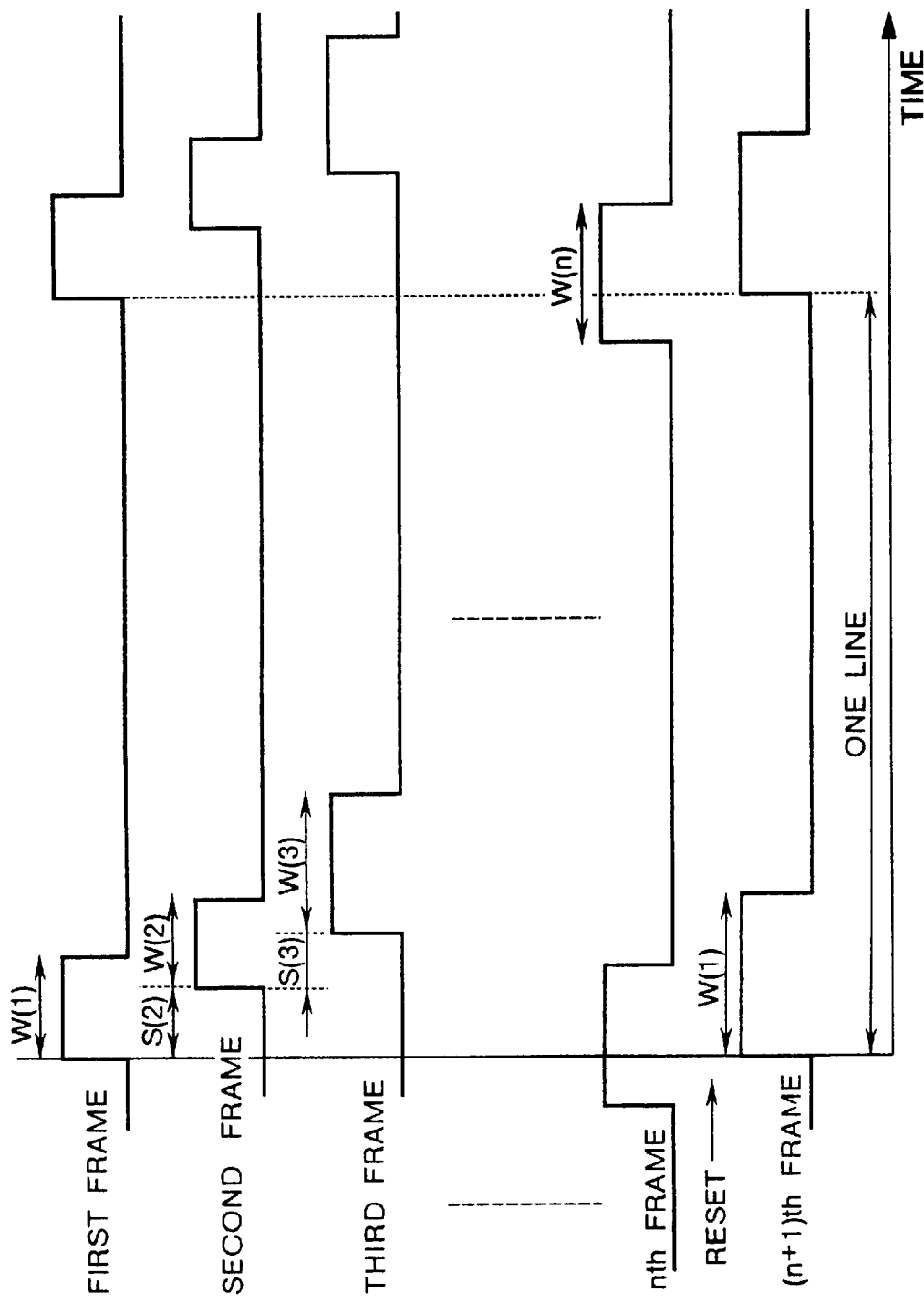
FIG. 2 is a timing chart for a refresh control in the embodiment.

FIG. 2 is a timing chart showing the output (refresh control signal) of the refresh control circuit 29 and the set values W(n) and S(n) (n indicates a frame number during the refresh operation) and a relation between them.

In the first frame after the start of the refresh, the output of the refresh control circuit 29 is set to "H (high level)" for a period of time of a width W(1) from the position that is shifted from the line head by only a shift amount S(1) in each line in accordance with the set values W(n) and S(n) [actually, W(1), S(1)] which are supplied from the refresh area setting circuit 31. The output of the refresh control circuit 29 is set to "L (low level)" for the other periods of time.

In the embodiment, S(1)=0. When the output of the refresh control circuit 29 is at "H", the OR circuit 32 connects either one of the switches 14 and 23 to the (a) contact irrespective of the output of the discrimination circuit 28 and forcedly executes the intraframe encoding. On the other hand, when the output of the refresh control circuit 29 is at "L", the OR circuit 32 controls the switching operations of the switches 14 and 23 in accordance with the output of the discrimination circuit 28 irrespective of the output of the refresh control circuit 29.

In the whole line of the first frame, the output of the refresh control circuit 29 is set to "H" for a period of time of the width corresponding to the set value W(1) from the position that is shifted from the line head by only the shift amount S(1). Therefore, on the picture plane, the refresh is executed by a vertical stripe of the width corresponding to the set value W(1).

In the second frame, the refresh area setting circuit 31 sets set values W(2) and S(2) into the refresh control circuit 29. The set values W(2) and S(2) are decided so as to set a refresh area moved in the horizontal direction on the picture plane so as to partially overlap the refresh area of the first frame. The refresh control circuit 29 sets its output to "H" as shown in FIG. 2 in accordance with the set values W(2) and S(2).

The same shall also similarly apply to the third and subsequent frames. The refresh area of the third frame is shifted in the horizontal direction by only S(3) from the refresh area of the second frame and its width is set to W(3). When the refresh area is moved in the horizontal direction and the refresh of the whole picture plane is finished, the refresh operation is reset. Specifically speaking, the refresh area setting circuit 31 is reset. Thus, the refresh area setting circuit 31 supplies new set values W(1) and S(1) [where, S(1)=0] to the refresh control circuit 29 in the next frame. In the case where there is no need to continue the partial refresh, the refresh control is finished.

Figure 3:
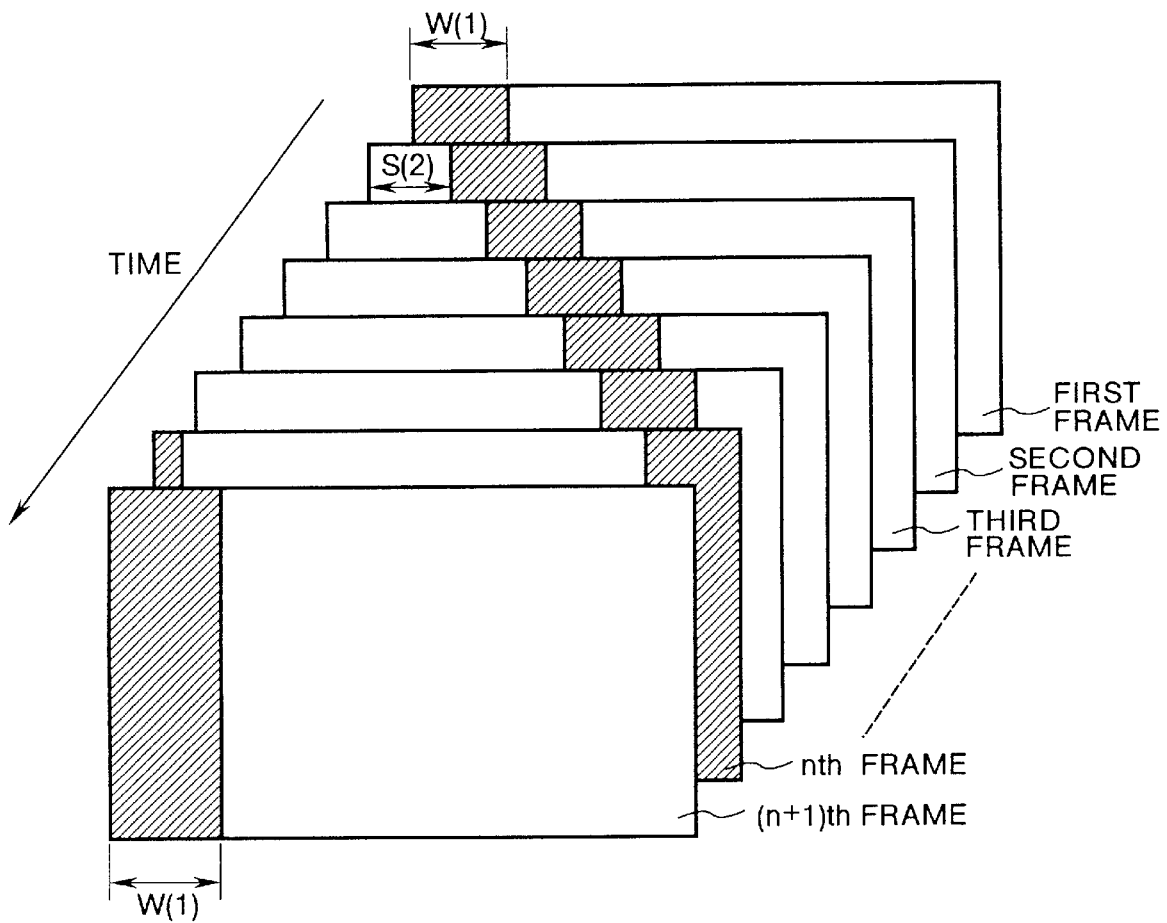
FIG. 3 is an explanatory diagram on a picture plane of a refresh operation in the embodiment.
Figure 4:
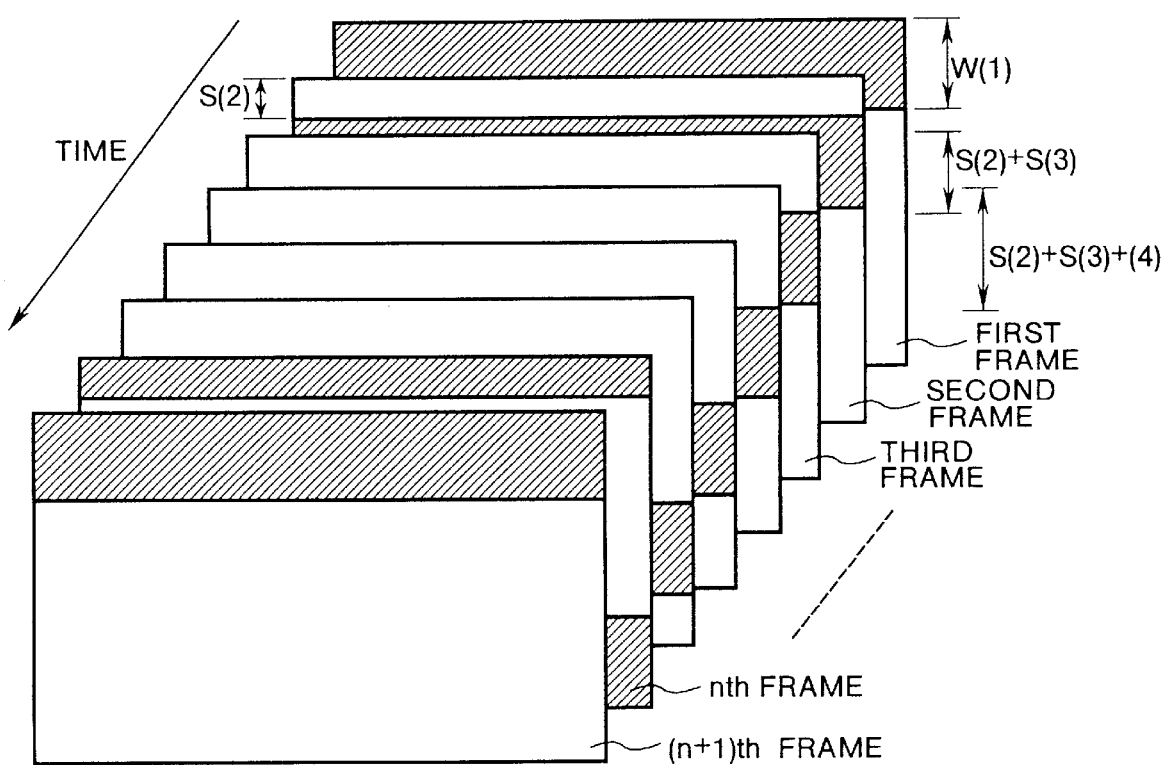
FIG. 4 is an explanatory diagram on the picture plane in the case where a refresh area is set to a lateral stripe shape.

FIG. 3 shows the positional relation of the refresh areas in each frame. Although the refresh areas have the vertical stripe shape in FIGS. 2 and 3, it will be obviously understood that the refresh areas have a horizontal stripe shape by reversing the vertical and horizontal relations. FIG. 4 shows the positional relation of the refresh areas in each frame in the case where the refresh areas have the horizontal stripe shape.

The operation of the refresh area setting circuit 31, specifically, a method of deciding the set values "W(n) and S(n)" of each frame will now be described.

Figure 5:
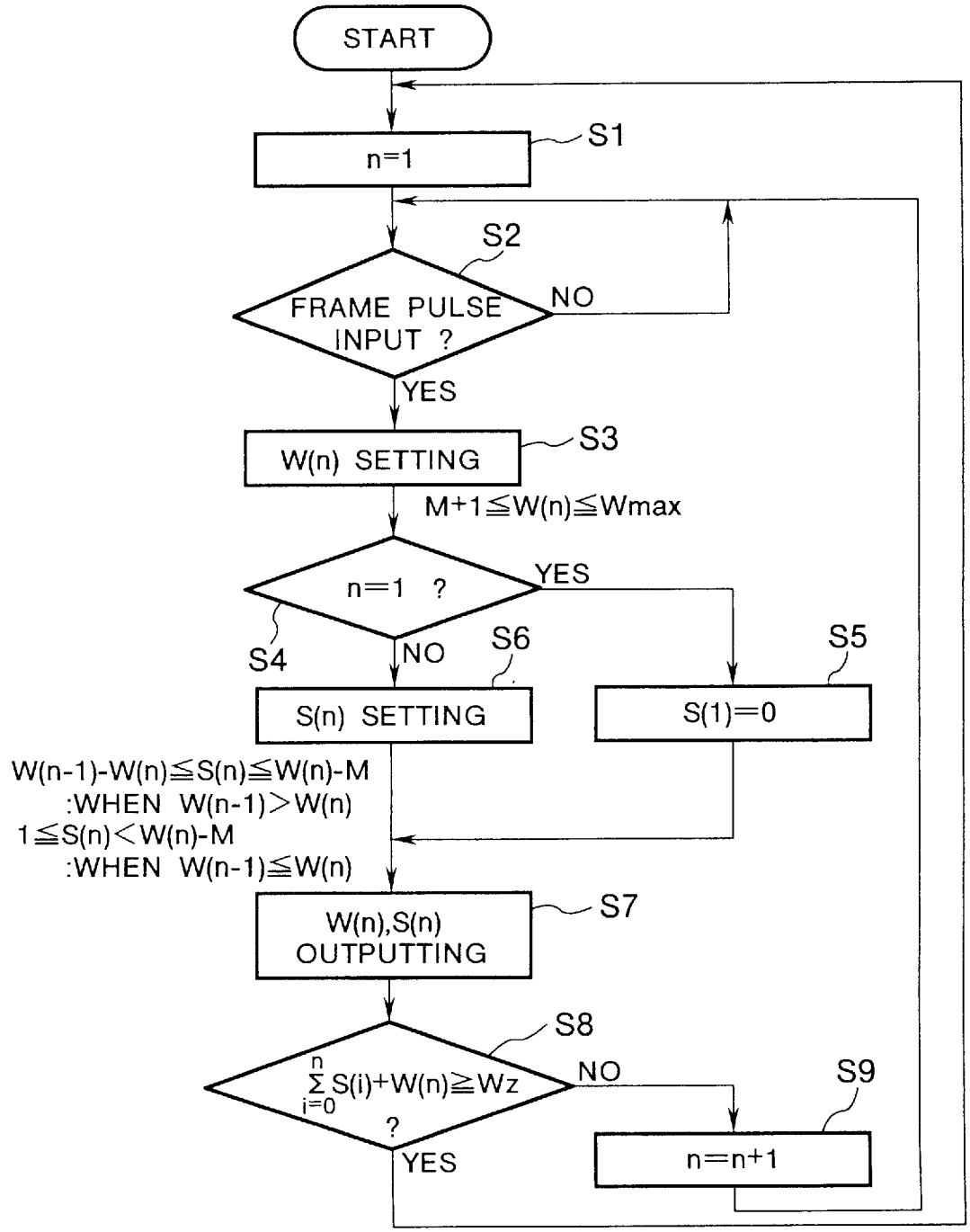
FIG. 5 is an operation flowchart of a refresh area setting circuit 31.

FIG. 5 shows a flowchart for the control operation of the refresh area setting circuit 31.

First, a frame number (n) is initialized to 1 (step S1). The apparatus waits for the input of a frame pulse (step S2). When the frame pulse is inputted (step S2), W(n) is set at random among the values which satisfy the following relations (step S3).

$$M+1 \leq W(n) \leq Wmax \tag{1}$$

(each value of W and M is based on a block unit or pixel unit).

M indicates the motion compensation range, namely, the width of a certain area having a possibility such that even if the area was refreshed in the frame just before the present frame, an error is propagated due to a motion compensation. Wmax denotes the maximum refresh area width which is determined by a degree of permission of a suddenly change in data generation amount. Wmax is preset in accordance with the memory capacity or the like of the buffer memory 25.

When (n)=1 (step S4), the shift amount is set to 0, namely, S(1)=0 (step S5). When (n) is equal to or larger than 2 (step S4), S(n) is set at random among the values which satisfy $$W(n-1-W(n)<S(n) \leq W(n-1)-M \tag{2}$$

in the case where W(n−1)>W(n) or $$1 \leq S(n) \leq W(n)-M \tag{3}$$

in the case where W(n−1)≦W(n) (step S6). The value of S is based on a block unit or pixel unit in a manner similar to each value of W and M.

The reasons why W(n) is decided in accordance with the above equation (1) and S(n) is determined in accordance with the expressions (2) and (3) will now be described with reference to FIGS. 6A to 6C.

Figure 6A:
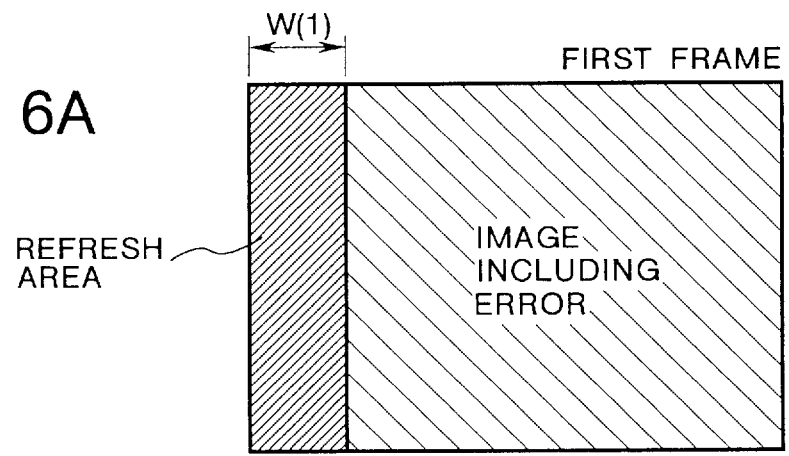
FIGS. 6A to 6C are explanatory diagrams of the relation of the refresh areas of each frame.
Figure 6B:
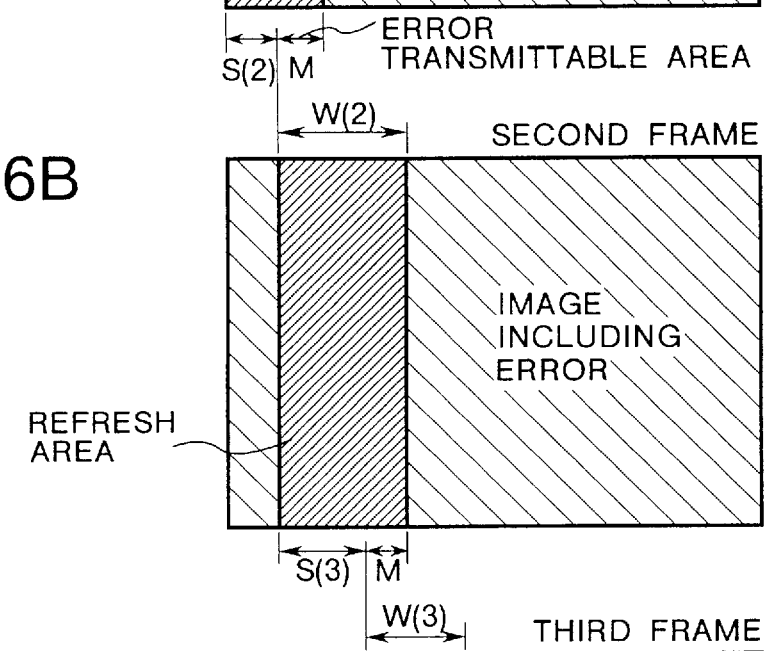
Figure 6C:
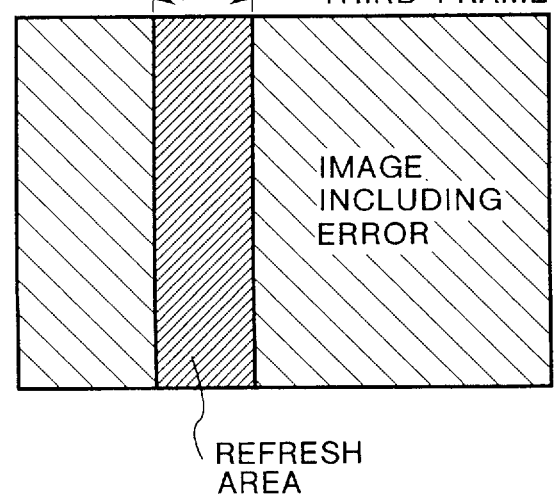

In FIGS. 6A to 6C, in case of refreshing at the width W(1) as shown in FIG. 6A in the first frame, the image portion (being capable of) including an error of the first frame has a possibility such that the error is propagated (or transmitted) in a compensation range due to an interframe motion compensation in the second frame. When the set values W(2) and S(2) of the second frame are set by the relation which satisfies the foregoing conditional expressions (1), (2), and (3), in the second frame, as shown in FIG. 6B, although the refresh area (area that is forcedly intraframe encoded) is shifted by only S(2) for the first frame, it certainly overlaps the refresh area of the first frame by an amount of M or more. Thus, the error transmittable area is again refreshed in the second frame, so that the error is not propagated to the area refreshed in the first frame.

By partially refreshing while moving the refresh area in the horizontal direction in accordance with the order in a manner similar to the above, all of the image areas (being capable of) including errors in the second and subsequent frames are also refreshed without leaving the errors.

The refresh area setting circuit 31 supplies the set values W(n) and S(n) set in steps S3, S5, and S6 to the refresh control circuit 29 (step S7). After that, whether the refresh area has reached the right edge of the picture plane or not is judged by the following expression (step S8).

$$\Sigma S(i)+W(n) \geq Wz \tag{4}$$

where, the sum of S(i) is obtained by adding the values from (i=1) to the present (n) and Wz denotes the entire picture plane width.

When the above conditional expression (4) is not satisfied (step S8), since this means that the refresh operation doesn't reach the right edge of the picture plane, (n) is increased by "1" (step S9). The processing routine advances to step S2 and the apparatus waits for the input of the next frame pulse. In the case where the conditional expression (4) is satisfied (step S8), since this means that the entire picture plane has once been refreshed in the nth frame, a series of refresh operations are finished. The processing routine is returned to step S1 and the refresh operation from the left edge of the picture plane is again started.

By the above operation, the entire area from the left edge to the right edge of the picture plane can be refreshed in the nth frame.

As mentioned above, the refresh control circuit 29 switches the connecting states of the switches 14 and 23 by the set values W and S set by the refresh area setting circuit 31. However, the switching operations of the switches 14 and 23 are also controlled by an output of the prediction area detection circuit 30. The control operation of the refresh control circuit 29 by the prediction area detection circuit 30 will now be described hereinbelow.

As mentioned above, in the embodiment, the refresh is performed by partially executing the intraframe encoding for a few frames without completing the refresh for one frame.

However, even in the block or pixel to be refreshed by the set values W and S, in the case where the image data (preceding frame) as a prediction value has been intraframe encoded, even if the image data is used as a prediction value, the error is not propagated. Therefore, there is no need to refresh. As mentioned above, the prediction area detection circuit 30 detects the block which doesn't need to refresh and supplies the refresh cancel signal to the refresh control circuit 29.

Even in the range of the set value W of the width of the refresh, the refresh control circuit 29 stops the refresh of such a portion in accordance with the refresh cancel signal from the prediction area detection circuit 30. By such control, an increase in generation data amount due to the intraframe encoding can be minimized while suppressing the propagation of the transmission error.

Explanation will be further made specifically. In the ordinary encoding process, the refresh control circuit 29 outputs the "L" signal. Therefore, the output of the OR circuit 32 coincides with the output of the discrimination circuit 28. The switching operations of the switches 14 and 23 are controlled by the discrimination circuit 28. For the block to be refreshed, the refresh control circuit 29 generates the "H" signal. Thus, the OR circuit 32 connects each of the switches 14 and 23 to the (a) contact, thereby allowing the intraframe encoding to be forcibly executed.

Even in the block or pixel to be refreshed by the set values W and S, in the case where the image data (preceding frame) as a prediction value has been intraframe encoded, even if the interframe encoding is performed by using such a prediction value, the error is not propagated. Namely, even in the area to be refreshed, all of the image data in such an area doesn't need to be intraframe encoded. This point will be specifically described with reference to FIG. 7.

Figure 7:
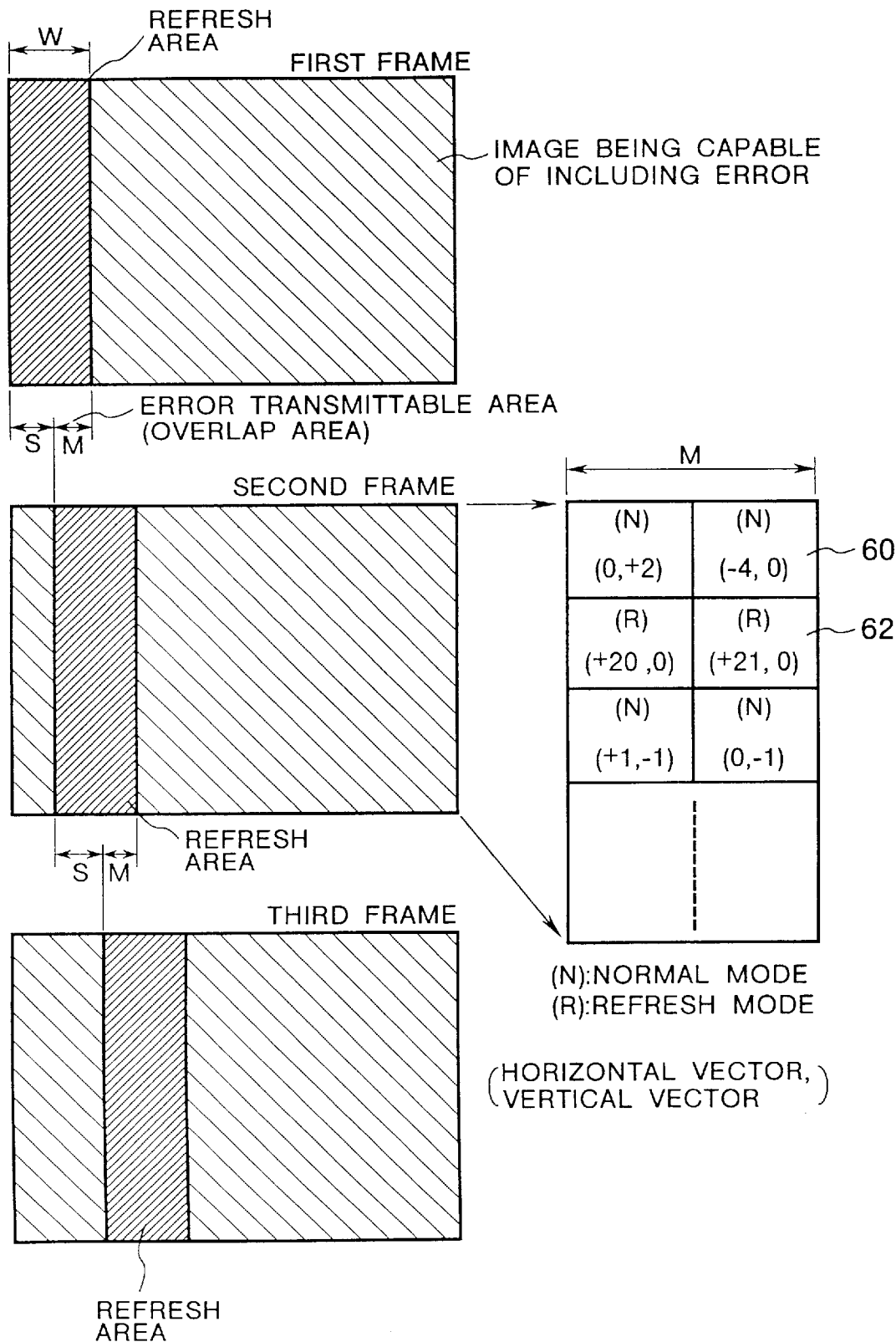
FIG. 7 is an explanatory diagram of a shift of the refresh area and an operation of a refresh cancel signal.

In FIG. 7, when attention is paid to an error transmittable area (overlap area) of the second frame, so long as the prediction value in the error transmittable area is based on the image (or image which was intraframe encoded) refreshed in the first frame, the error is not propagated.

For convenience of explanation, the error transmittable area is set to, for instance, two blocks (one block is constructed by 8 pixels×8 lines) in the horizontal direction as shown on the right side in FIG. 7.

In FIG. 7, (N) denotes a block to be encoded in the normal mode in the second frame; (R) a block to be encoded in the refresh mode in the second frame; (m, n) a motion vector of a motion compensation prediction; (m) the number of pixels in the horizontal direction; and (n) the number of lines in the vertical direction. Now, assuming that the frame to be encoded and the prediction frame are overlapped at the same position, the block to be encoded is encoded by using the image on the left side by only (m) pixels as a prediction value when (m) has a minus value and is block formed by the image signal on the right side by only (m) pixels when (m) has a plus value. With respect to (n), the block to be encoded is encoded by using the image on the upper side by only (n) lines when (n) has a minus value and is block formed by the image signal on the lower side by only (n) lines when (n) has a plus value.

In the example shown in FIG. 7, a right upper block 60 has been motion compensation predicted by the motion vector of −4 pixels in the horizontal direction and 0 line in the vertical direction. A block 62 under the block 60 is motion compensation predicted by the motion vector of 21 pixels in the horizontal direction and 0 line in the vertical direction. Therefore, since the block 60 of the second frame is predicted by the image existing on the left side than the position of the block 60 in the first frame, namely, by the image included in the refresh area of the first frame, the error is not propagated from the first frame. That is, there is no need to refresh the block 60 of the second frame.

The prediction area detection circuit 30 detects whether the area predicted from the output of the motion vector detection circuit 21 has been refreshed in the preceding frame or not. When such an area has been refreshed, the refresh cancel signal is supplied to the refresh control circuit 29. When the refresh cancel signal is inputted, the refresh control circuit 29 generates the "L" signal for the processing period of time of such a block irrespective of the set values W and S which are outputted from the refresh area setting circuit 31. Thus, the switching operations of the switches 14 and 23 are mainly controlled by the output of the discrimination circuit 28 (operation in the normal mode).

In the block 62 in FIG. 7, the horizontal motion vector is set to +21 and is predicted from the image portion that is not refreshed in the first frame. Therefore, there is a possibility such that the error is propagated. The prediction area detection circuit 30 detects a propagation possibility of the error and doesn't output the refresh cancel signal. Thus, the refresh control circuit 29 is refreshed in accordance with the set values W and S outputted from the refresh area setting circuit 31 (operation in the refresh mode).

In the overlap area of the frame to be encoded, the prediction area detection circuit 30 uses the prediction motion vector from the motion vector detection circuit 21 and outputs the refresh cancel signal for the block that is predicted from the area refreshed by the prediction frame. For the block which is predicted from the area that is not refreshed in the prediction frame, the refresh cancel signal is not outputted. Namely, in cases other than the case where the prediction value is obtained from the overlapped area of the preceding frame, the prediction area detection circuit 30 doesn't output the refresh cancel signal.

With respect to the remaining block in the error transmittable area as well, in accordance with the set values W and S and the refresh cancel signal, the refresh control circuit 29 similarly processes and refreshes the necessary minimum blocks. The next and subsequent frames are also similarly refreshed.

By the foregoing operation, in the embodiment, the necessary minimum range is refreshed. An increase in data amount due to the refresh can be suppressed, the deterioration of the picture quality can be reduced, and the overall picture quality can be improved.

According to the embodiment as mentioned above, since the width W(n) and shift amount S(n) which are set in each of the first to nth frames are determined at random while satisfying the foregoing conditional expressions (1) to (4), the width of the refresh area and its moving speed are irregular on the picture plane. Consequently, it is difficult to visually discriminate the refresh area. The picture quality deterioration which occurs because the refresh area can be visually discriminated can be prevented.

Further, since only a part of the whole picture plane is always refreshed without simultaneously refreshing the whole picture plane, a sudden change in information amount due to the refresh can be avoided. Thus, influences on the sudden picture quality deterioration and buffer control (information amount control) are reduced.

Further, according to the embodiment, since the refresh operation is cancelled for the block in which the propagation of the error is not considered even in the refresh area, the necessary minimum range is refreshed. An increase in data amount by the refresh is further suppressed. The picture quality deterioration can be reduced. The overall picture quality can be improved.

The present invention can be embodied in other various forms without departing from the spirit and main features of the invention.

For example, although the embodiments have been described with respect to the example of the interframe motion compensation encoding, the invention can be also similarly embodied with respect to an interfield motion compensation encoding. With regard to the interfield/interframe motion compensations, similar operations are executed with regard to each motion compensation range. Each of the set values M, W(n), and S(n) can be based on any one of the pixel unit and block unit and may be also set in accordance with a construction of a hardware, respectively.

Although the embodiments have been described with respect to the example of the prediction encoding using the preceding frame as a prediction frame, it will be obviously understood that the 2-preceding frame or 3-preceding frame can be also used as a prediction frame. Namely, the prediction frame is not limited to the 1-preceding frame. Further, the prediction frame is also not limited to the preceding frame. For example, the invention can be also applied to a prediction encoding using the post frame or preceding and post frames as prediction frames and, further, a prediction encoding of a combination of them.

In other words, the foregoing description of the embodiments has been given for illustrative purposes only and is not to be construed as imposing any limitation in any respect.

The scope of the invention is, therefore, to be determined solely by the following claims, and is not limited by the text of the specifications and alterations made within a scope equivalent to the scope of the claims falling within the true spirit and scope of the invention.

What is claimed is:

1. An image encoding apparatus in which one picture is divided into a refresh area and another area and input image data is encoded by using an intrapicture encoding mode or a motion compensation interpicture encoding mode according to the divided area, comprising:

a) refresh area setting means for setting, in a picture plane, a refresh area to which an intrapicture encoding is forcibly performed, in such a manner that the refresh area set in different picture planes overlap with each other by at least an area corresponding to a motion compensation range, the refresh area set by said refresh area setting means being shifted between the different picture planes and at least one of a width and a shift amount of the refresh area of each of the different picture planes being set so as not to coincide with each other; and b) refresh control means for forcibly setting an encoding mode of the input image data to the intrapicture encoding mode in the refresh area set by said refresh area setting means.

2. An image encoding apparatus in which one picture is divided into a refresh area and another area and input image data is encoded by using an intrapicture encoding mode or a motion compensation interpicture encoding mode according to the divided area, comprising:

a) refresh area setting means for setting, in a picture plane, a refresh area to which an intrapicture encoding is forcibly performed, in such a manner that the refresh area set in different picture planes overlap with each other by at least an area corresponding to a motion compensation range;

b) refresh control means for forcibly setting an encoding mode of the input image data to the intrapicture encoding mode in the refresh area set by said refresh area setting means; and c) cancel means for cancelling a refresh of the refresh area set by said refresh area setting means, when a motion prediction image data for interpicture encoding in the refresh area has been intrapicture encoded in the previous picture plane.

3. An image encoding apparatus comprising:

a) calculating means for calculating a difference between input image data to be encoded and its prediction value;

b) selecting means for selecting one of the input image data and an output of said calculating means;

c) encoding means for encoding an output of said selecting means;

d) decoding means for decoding an output of said encoding means;

e) adding means for outputting an output of said decoding means as it is or adding a prediction value to the output and outputting an addition result in accordance with a selecting operation of said selecting means;

f) memory means for storing output image data of said adding means;

g) motion compensating means for executing a motion compensation from the image data stored in said memory means and the input image data, and for supplying motion compensated data as the prediction value to said calculating means and said adding means;

h) detecting means for detecting whether the prediction value has been intrapicture encoded or not, and for outputting a refresh cancel signal in accordance with a detection result; and i) refresh control means for setting, in a picture plane, a refresh area of a predetermined width W while shifting by only a predetermined shift value S between picture planes, and for controlling said selecting means and said adding means for allowing an intrapicture encoding to be forcibly executed in the refresh area of each picture plane, wherein said refresh control means cancels a refresh in accordance with an output of said detecting means, and wherein the refresh area and another area are in one picture.

4. An image encoding apparatus comprising:

a) calculating means for calculating a difference between input image data to be encoded and its prediction value;

b) selecting means for selecting one of the input image data and an output of said calculating means;

c) encoding means for encoding an output of said selecting means;

d) decoding means for decoding an output of said encoding means;

e) adding means for outputting an output of said decoding means as it is or adding a prediction value to the output and outputting an addition result in accordance with a selecting operation of said selecting means;

f) memory means for storing output image data of said adding means;

g) motion compensating means for executing a motion compensation from the image data stored in said memory means and the input image data, and for supplying a motion compensated data as the prediction value to said calculating means and said adding means;

h) refresh area setting means for setting, in a picture plane, a refresh area to which an intrapicture encoding is forcibly performed, in such a manner that the refresh area set in different picture planes overlap with each other by at least an area corresponding to a motion compensation range, wherein the refresh area and another area are in one picture; and i) refresh control means for controlling said selecting means and said adding means for allowing a intrapicture encoding to be forcibly executed in the refresh area set by said refresh area setting means.

5. An image encoding apparatus in which one picture is divided into a refresh area and another area and input image data is encoded by using an intrapicture encoding mode or a motion compensation interpicture encoding mode according to the divided area, comprising:

a) refresh area setting means for setting, in a picture plane, a refresh area of a predetermined width W while shifting by only a predetermined shift value S between picture planes;

b) refresh control means for forcibly setting an encoding mode of the input image data to the intrapicture encoding mode in the refresh area set by said refresh area setting means; and c) cancel means for cancelling a refresh of the refresh area set by said refresh area setting means, when a motion prediction image portion for interpicture encoding in the refresh area has been intrapicture encoded in the previous picture plane.

6. An image encoding method in which one picture is divided into a refresh area and another area and input image data is encoded by using an intrapicture encoding mode or a motion compensation interpicture encoding mode according to the divided area, comprising:

a) a refresh area setting step of setting, in a picture plane, a refresh area to which an intrapicture encoding is forcibly performed, in such a manner that the refresh area set in different picture planes overlap with each other by at least an area corresponding to a motion compensation range, the refresh area set by said refresh area setting step being shifted between the different picture planes and at least one of a width and a shift amount of the refresh area of each of the different picture planes being set so as not to coincide with each other; and b) a refresh control step of forcibly setting an encoding mode of the input image data to the intrapicture encoding mode in the refresh area set by said refresh area setting step.

7. An image encoding method in which one picture is divided into a refresh area and another area and input image data is encoded by using an intrapicture encoding mode or a motion compensation interpicture encoding mode according to the divided area, comprising:

a) a refresh area setting step of setting, in a picture plane, a refresh area to which an intrapicture encoding is forcibly performed, in such a manner that the refresh area set in different picture planes overlap with each other by at least an area corresponding to a motion compensation range;

b) a refresh control step of forcibly setting an encoding mode of the input image data to the intrapicture encoding mode in the refresh area set by said refresh area setting step; and c) a cancel step of cancelling a refresh of the refresh area set by said refresh area setting step, when a motion prediction image data for interpicture encoding in the refresh area has been intrapicture encoded in the previous picture plane.

8. An image encoding method comprising:

a) a calculating step of calculating a difference between input image data to be encoded and its prediction value;

b) a selecting step of selecting one of the input image data and a result of said calculating step;

c) an encoding step of encoding a result of said selecting step;

d) a decoding step of decoding a result of said encoding step;

e) an adding step of outputting a result of said decoding step as it is or adding a prediction value to the result and outputting an addition result in accordance with a selecting operation of said selecting step;

f) a memory step of storing output image data of said adding step;

g) a motion compensating step of executing a motion compensation from the image data stored in said memory step and the input image data, and for supplying motion compensated data as the prediction value for said calculating step and said adding step;

h) a detecting step of detecting whether the prediction value has been intrapicture encoded or not, and for outputting a refresh cancel signal in accordance with a detection result; and i) a refresh control step of setting, in a picture plane, a refresh area of a predetermined width W while shifting by only a predetermined shift value S between picture planes, and for controlling said selecting step and said adding step for allowing an intrapicture encoding to be forcibly executed in the refresh area of each picture plane, wherein said refresh control step cancels a refresh in accordance with a result of said detecting step, and wherein the refresh area and the another area are in one picture.

9. An image encoding method comprising:

a) a calculating step of calculating a difference between input image data to be encoded and its prediction value;

b) a selecting step of selecting one of the input image data and a result of said calculating step;

c) an encoding step of encoding a result of said selecting step;

d) a decoding step of decoding a result of said encoding step;

e) an adding step of outputting a result of said decoding step as it is or adding a prediction value to the result and outputting an addition result in accordance with a selecting operation of said selecting step;

f) a memory step of storing output image data of said adding step;

g) a motion compensating step of executing a motion compensation from the image data stored in said memory step and the input image data, and for supplying a motion compensated data as the prediction value for said calculating step and said adding step;

h) a refresh area setting step of setting, in a picture plane, a refresh area to which an intrapicture encoding is forcibly performed, in such a manner that the refresh area set in different picture planes overlap with each other by at least an area corresponding to a motion compensation range, wherein the refresh area and the another area are in one picture; and i) a refresh control step of controlling said selecting step and said adding step for allowing a intrapicture encoding to be forcibly executed in the refresh area set by said refresh area setting step.

10. An image encoding method in which one picture is divided into a refresh area and another area and input image data is encoded by using an intrapicture encoding mode or a motion compensation interpicture encoding mode according to the divided area, comprising:

a) a refresh area setting step of setting, in a picture plane, a refresh area of a predetermined width W while shifting by only a predetermined shift value S between picture planes;

b) a refresh control step of forcibly setting an encoding mode of the input image data to the intrapicture encoding mode in the refresh area set by said refresh area setting step; and c) a cancel step of cancelling a refresh of the refresh area set by said refresh area setting step, when a motion prediction image portion for interpicture encoding in the refresh area has been intrapicture encoded in the previous picture plane.

11. An apparatus according to claim 1, wherein even in the refresh area, when an image portion as a prediction image of the interpicture encoding has been intrapicture encoded, a refresh is cancelled.

12. An apparatus according to claim 1, wherein even in the refresh area, when an image portion as a prediction image of the interpicture encoding has been refreshed, a refresh is cancelled.

13. An apparatus according to claim 1, further comprising encoding means for encoding said input image data by using an orthogonal transformation.

14. An apparatus according to claim 1, wherein when it is assumed that a whole width of a picture plane of the image to be encoded is set to Wz and the motion compensation range is set to M, said refresh area setting means sets a width W(n) and a shift amount S(n) of the refresh area of the nth picture plane after the start of a refresh in a range which satisfies $$M+1 \leq Wn$$

$$W(n-1)-W(n) < S(n) \leq W[(n)](n-1)-M$$

where, W[(m-1)>W(m)](n-1)>W(n), S(n)≧1 (n is an integer of 2 or more) for a width W(n-1) and a shift amount S(n-1) of a preceding picture plane.

15. An apparatus according to claim 2, wherein said refresh area is shifted between the picture planes.

16. An apparatus according to claim 15, wherein when it is assumed that a width of the refresh area is set to W and a shift amount is set to S and a motion compensation range is set to M, said refresh area setting means sets in a range which satisfies $$W \geq M+1$$

$$1 \leq S < W-M.$$

17. An apparatus according to claim 3, wherein said refresh control means sets the refresh area of the picture plane to be encoded for the refresh area set by the picture plane as a prediction value of its interframe encoding so as to overlap by a predetermined width M.

18. An apparatus according to claim 17, wherein said predetermined width M of the overlap of said refresh area is equal to or larger than a compensatable range of a motion compensation prediction.

19. An apparatus according to claim 18, wherein said refresh area setting means sets in a range which satisfies $$W \geq M+1$$

$$1 \leq S < W-M.$$

* * * * *

UNITED STATES PATENT AND TRADEMARK OFFICE
CERTIFICATE OF CORRECTION

PATENT NO. : 5,805,223
DATED : September 8, 1998
INVENTOR(S) : AKIHIRO SHIKAKURA ET AL.

It is certified that error appears in the above-identified patent and that said Letters Patent is hereby corrected as shown below:

On the title page, item

[56] ATTORNEY

Insert: --Attorney, Agent or Firm: Fitzpatrick, Cella, Harper & Scinto--.

COLUMN 1

Line 37, "difference" should read --differences--.

COLUMN 2

Line 20, "moved" should read --moves--.
    Line 51, "forcedly" should read --forcibly--.
    Line 53, "forcedly" should read --forcibly--.

UNITED STATES PATENT AND TRADEMARK OFFICE
CERTIFICATE OF CORRECTION

PATENT NO. : 5,805,223

DATED : September 8, 1998

INVENTOR(S) : AKIHIRO SHIKAKURA ET AL.

It is certified that error appears in the above-identified patent and that said Letters Patent is hereby corrected as shown below:

<u>COLUMN 4</u>

Line 49, ""L"(low level)."" should read
--"L (low level)".--.

<u>COLUMN 6</u>

Line 28, "embodiment, S(1)0. When" should read
--embodiment S(1)=0, when--.

<u>COLUMN 7</u>

Line 26, "suddenly" should read --sudden--.
Line 34, "W(n)" should read --W(n))--;
"<" should read --≤--; and
Line 37, "W(n)-M" should read --W(n-1)-M --.

<u>COLUMN 12</u>

Line 41, "allowing a" should read --allowing an--;
and "intrapi-" should read --intrapic- --; and
Line 42, "cture" should read --ture--.

UNITED STATES PATENT AND TRADEMARK OFFICE
CERTIFICATE OF CORRECTION

PATENT NO. : 5,805,233

DATED : September 8, 1998

INVENTOR(S) : AKIHIRO SHIKAKURA ET AL.

It is certified that error appears in the above-identified patent and that said Letters Patent is hereby corrected as shown below:

COLUMN 13

Line 24, "Area" should read --areas--.

COLUMN 14

Line 4, "another" should read --other--.
  Line 30, "area" should read --areas--.
  Line 33, "another" should read --other--.
  Line 35, "allowing a" should read --allowing an--.

Signed and Sealed this

Twenty-first Day of November, 2000

Attest:

Q. TODD DICKINSON

Attesting Officer      *Director of Patents and Trademarks*

UNITED STATES PATENT AND TRADEMARK OFFICE
CERTIFICATE OF CORRECTION

PATENT NO. : 5,805,223
DATED : September 8, 1998
INVENTOR(S) : Akihiro Shikakura et al.

It is certified that error appears in the above-identified patent and that said Letters Patent is hereby corrected as shown below:

Title page,
Items [76], [73] and [56] should read as follows:

-- [76] Inventors: Akihiro Shikakura, Kawaski, Japan; Masato Kato, Inagi-shi, Japan. ; and insert below item [76] the following:
-- [73] Assignee: Canon Kabshiki Kaisha, Tokyo, Japan; and above item [57] insert the following:
-- [56] Attorney, Agent or Firm: Fitzpatrick, Cella, Harper & Scinto --.

Signed and Sealed this

Twelfth Day of February, 2002

Attest:

JAMES E. ROGAN
Attesting Officer
Director of the United States Patent and Trademark Office